United States Patent [19]

Hyodo et al.

[11] Patent Number: 4,867,088
[45] Date of Patent: Sep. 19, 1989

[54] DEVICE FOR SELECTING A DIAGNOSING DEVICE OR STITCH FORMING DEVICE IN ELECTRONIC SEWING MACHINE

[75] Inventors: Tohru Hyodo; Fumihiko Kobayashi, both of Tokyo, Japan

[73] Assignee: Janome Sewing Machine Co., Ltd., Tokyo, Japan

[21] Appl. No.: 187,081

[22] Filed: Apr. 27, 1988

[30] Foreign Application Priority Data

Apr. 30, 1987 [JP] Japan .............................. 62-104695

[51] Int. Cl.⁴ ............................................ D05B 3/02
[52] U.S. Cl. .................................................. 112/453
[58] Field of Search .............. 112/453, 456, 457, 458, 112/275, 277, 121.11, 121.12, 445

[56] References Cited

U.S. PATENT DOCUMENTS 4,262,614  4/1981  Sugaya et al. .................. 112/453 X
4,481,507  11/1984 Takiguchi et al. ............. 112/277 X
4,554,879  11/1985 Eguchi ............................ 112/277 X Primary Examiner—Peter Nerbun
Attorney, Agent, or Firm—Michael J. Striker

[57] ABSTRACT

Predetermined pattern selecting and function selecting keys of an electronic sewing machine are employed for controlling the selection between normal operation of a stitch forming device and a built-in diagnosing device. The diagnosing device is enabled only when the power switch of the machine is on while the predetermined function selecting key is kept depressed, and the predetermined pattern selecting key is kept depressed for a predetermined time interval. The stitch forming device is enabled when the two predetermined keys are not depressed for the predetermined time interval.

2 Claims, 2 Drawing Sheets

DEVICE FOR SELECTING A DIAGNOSING DEVICE OR STITCH FORMING DEVICE IN ELECTRONIC SEWING MACHINE

BACKGROUND OF THE INVENTION

The present invention relates to a device for the selection of a stitch forming device in an electronic sewing machine and a built-in diagnosing device described in U.S. Pat. No. 4,480,561 assigned to the same assignee.

In methods of selecting a diagnosing device, there have been employed (1) a method wherein an exclusive switch is provided at a position at which its actuation is difficult, and the switch is turned "on," and (2) a method wherein actuation of a specified key for the stitch forming operation is combined with a special condition (for example, an operation in which a power source is closed while a corresponding key is kept depressed).

The prior-art methods, however, have the following disadvantages: With the method (1), since a place for installing the exclusive switch must be secure, the structure of the sewing machine becomes complicated, and besides, expenses for the switch component and for the installation thereof are involved. With the method (2), since the diagnosing device is easily actuated by an erroneous operation, the sewing machine is difficult to use, and at the same time, diagnostic operations are limited lest any injury be inflicted on the user by erroneous operating steps.

SUMMARY OF THE INVENTION

An object of the present invention is to eliminate the disadvantages of the prior-art techniques mentioned above.

The present invention is similar to the prior-art method (2) wherein one of keys for ordinary operations of the stitch forming device is set for the selection of the diagnosing device, and that while the key is kept depressed, a power source switch is turned "on," whereby the diagnosing device can be operated. In the present invention, however, unless another set key (for example, "CANCEL" key the use frequency of which is low at the start of stitching) is depressed within a fixed time interval (for example, 2.5 seconds), the diagnosing device is stopped, and the stitch forming device is actuated instead.

DETAILED DESCRIPTION OF THE INVENTION

Figure 2:
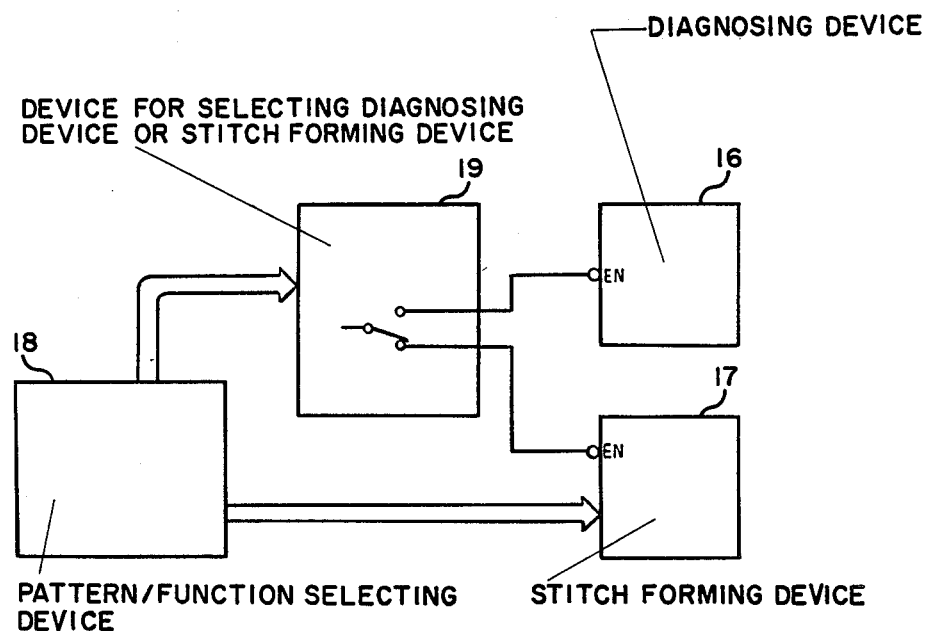
FIG. 2 is a block diagram showing the concept of the present invention.

FIG. 2 is a block diagram for explaining the present invention. A pattern/function selecting device 18 has the function of transferring the information of a valid key to stitch forming device 17 or to a device 19 for the selection of a diagnosing device 16 and the stitch forming device 17, upon discriminating the valid key when a pattern selection key (SW1-SW4) or a function selecting key (SW5-SW8) has been depressed. The device 19 for the selection of the diagnosing device 16 and the stitch forming device 18 receives the information signal from the pattern/function selection operation device, and selects and validates either the diagnosing device 16 or the stitch forming device 13 on the basis of the discrimination of the valid key at initialization and the time limited effect of the depression or non-depression of a set selection key. This device 19 is the principal element of the present invention. The diagnosing device 16 when selected by the device 19 checks by a CPU the state of input/output units connected to the input/output ports thereof. On the other hand, the stitch forming device 17 when selected by the device 19 performs the pattern storing, control of the discrimination, display, storage etc. of a selected pattern and further performs calculations based on the control, so as to stitch the embroidery pattern and to control the normal operation of the sewing machine.

An embodiment of the present invention will be described with reference to other figures of the drawings.

Figure 1:
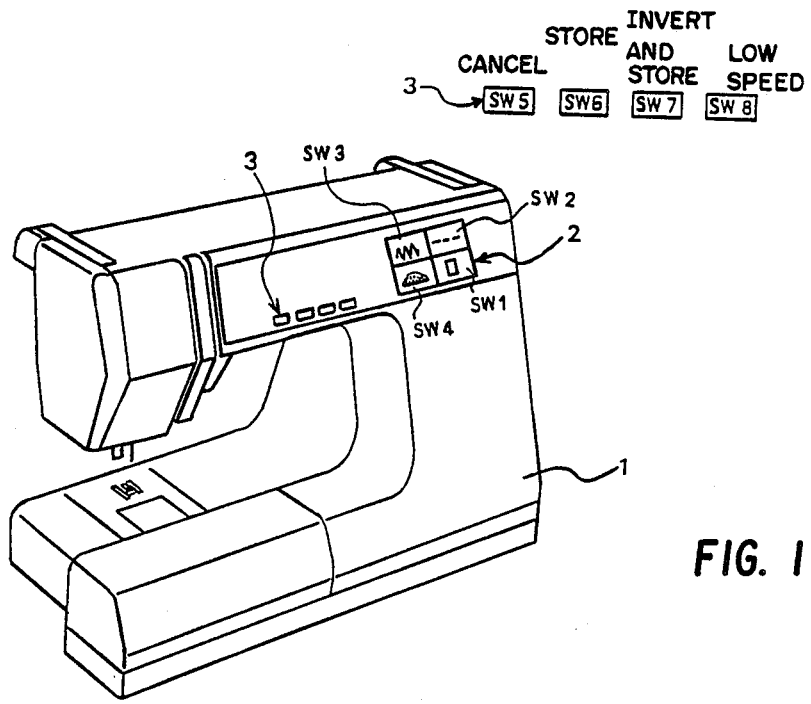
FIG. 1 is a perspective view of an electronic sewing machine to which the present invention is applied.

Referring to FIG. 1, a pattern selecting device 2 and a function selecting device 3 are disposed at the front face of an electronic sewing machine 1.

Figure 3:
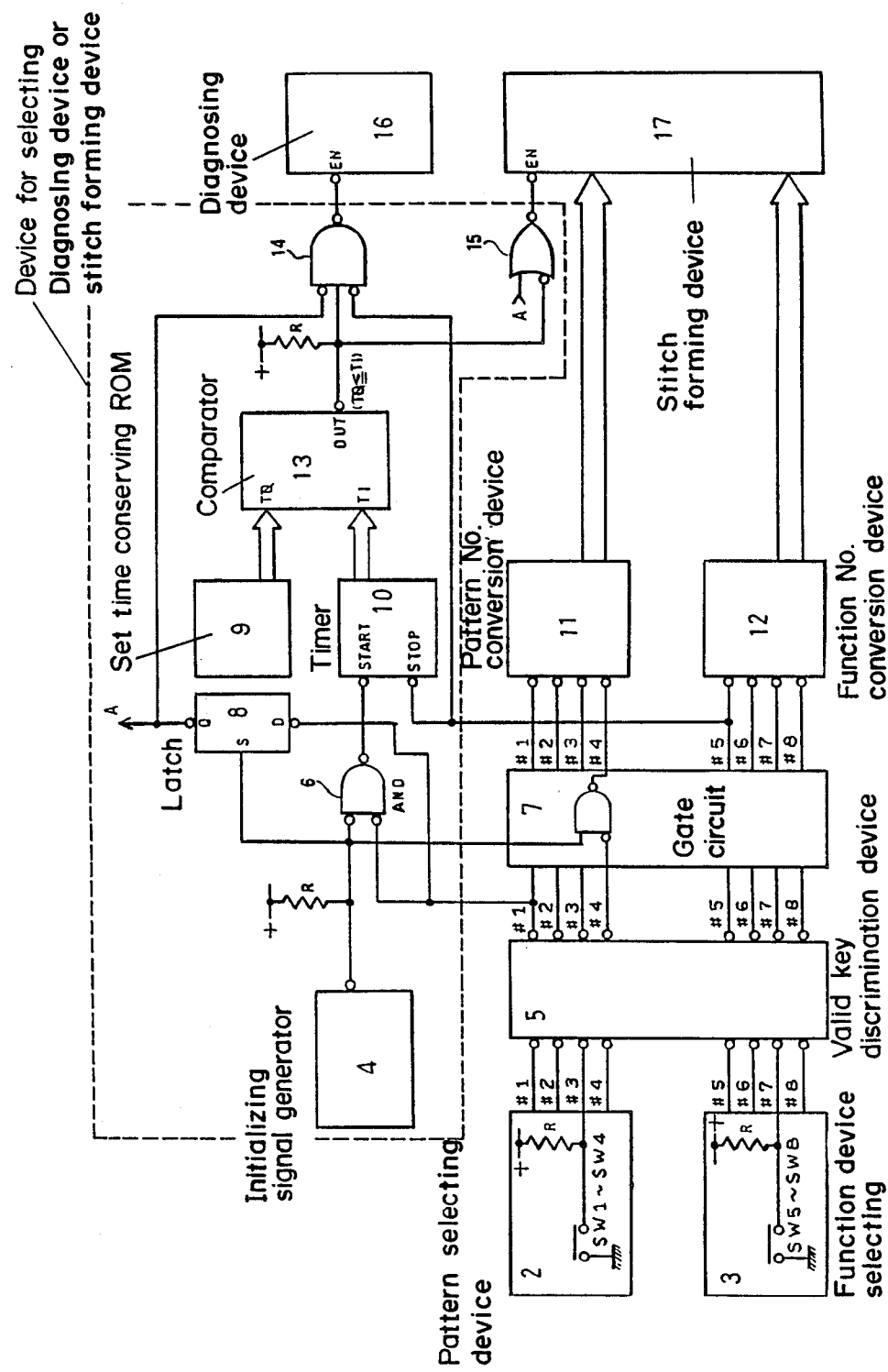
FIG. 3 is a detailed control block diagram showing an embodiment of the present invention.

In more detail, as shown in FIG. 3, the pattern selecting device 2 includes four keys SW1-SW4 and the function selecting device 3 is constructed of four keys SW5-SW8. When any of the keys is depressed, it sends an "L" (low level) signal to a valid key discrimination device 5.

The valid key discrimination device 5 reads the signals of the devices 2 and 3 at fixed cycles (for example, at intervals of 15 ms.). In case when it has simultaneously recognized a plurality of "L" signals, it handles all the signals as being of "H" (high level) and nullifies the double depression of the keys.

In addition, the read signal of the device 2 or 3 is stored in a RAM (not shown), and only when a predetermined key is kept depressed for two cycles or longer, an output terminal of the valid key discrimination device 5 corresponding to the input terminal thereof for the depressed key, is rendered "L."

After a non-illustrated power switch has been turned "on," an initializing signal generator 4 produces "L" until the valid key discrimination device 5 completes the delivery of its output signal indications of the result of discrimination, namely the presence or absence of the actuation of predetermined key #1. Thereafter, the initializing signal generator 4 functions to produce "H" (usually, for several tens ms.).

An AND circuit 6 produces an "L" output only when the initializing signal of the signal generator 4 is "L" and the output terminal #1 of the valid key discrimination device 5 is "L."

A gate circuit 7 produces an "L" output only when the initializing signal of the signal generator 4 is "H" and the output terminal #4 of the valid key discrimination device 5 is "L."

A latch 8 has its S terminal connected to the output of the initializing signal generator 4, and detects the rising edge of "L"→"H." It latches the signal of the D terminal thereof (connected to one input terminal of the AND circuit 6) on that occasion, and delivers the latched signal from the Q terminal thereof.

A set time conserving ROM 9 stores a code (counter value) corresponding to 2.5 seconds.

A timer 10 has its START terminal connected to the output terminal of the AND circuit 6, and since having once detected the "L" signal, it adds an elapsed time so as to deliver a corresponding code (a counter value). The STOP terminal of timer 10 is connected to the terminal #5 of the gate circuit 7, and it stops the addition when the "L" signal has been once detected.

A comparator 13 compares the time interval code (a counter value T0) of the set time stored in ROM 9 and the counter value T1 of the timer 10, and it delivers an "L" signal from the output terminal thereof (OUT) when the value of the timer 10 has become greater.

A pattern No. conversion device 11 converts the "L" signals of the output terminals #1–#4 of the gate circit 7 into pattern Nos., #1–#4 respectively and stores them. (In this embodiment, the pattern Nos. correspond to BH, straight, ZZ and satin patterns.)

A function No. conversion device 12 converts the "L" signals of the output terminals #5–#8 of the gate circuit 7 into the codes of function keys respectively and stores them. (In this embodiment, the codes are CANCEL SW5, STORE SW6, INVERT AND STORE SW7, and LOW SPEED SW8.)

A gate circuit 14 produces an "L" output only when the output of the latch 8 is "L," the output of the comparator 13 is "H" and the output terminal #5 of the gate circuit 7 is "L."

A gate circuit 15 produces an "L" output when the output of the latch 8 is "H" or the output of the comparator 13 is "L."

A diagnosing device 16 has its terminal EN connected to the output of the gate circuit 14. Thus, the operation of this diagnosing device is started by the signal of the falling edge of "H"→"L" so as to check stepwise the state of individual electronic components employed in the electronic sewing machine.

The stitch forming device 17 has its terminal END connected to the output of the gate circuit 15, and starts operating upon the detection of the "L" signal.

Pattern data corresponding to the signal of the pattern No. conversion device 11 is read out into device 17 to stitch the pattern by means of a pattern formation device.

In accordance with the signal of the function No. conversion device 12, function No. or Code for storing the pattern (SW6), for inverting and storing the pattern (SW7) or for canceling the pattern (SW5) is stored so as to perform calculations, or the highest r. p. m. of the sewing machine is switched according to the low speed key SW8.

Next, the operation of the device of FIG. 3 will be described.

① When the power switch (not shown) is turned "on" with the predetermined key #1 kept depressed, the output terminal of the AND circuit 6 becomes "L" owing to the output "L" of the initializing signal generator 4 and the output "L" of the output terminal #1 of the valid key discrimination device 5.

② Since the START terminal of the timer 10 becomes "L," the addition of the timer value is started, and this timer value is delivered as an output from the OUT terminal. Here, the initial value of the timer is set to zero.

③ Besides, the output of the signal generator 4 changes from "L" to "H" in a very short time (several tens ms.), and the latch 8 latches the "L" input of the D terminal as the output of the Q terminal.

④ In accordance with the fact that the output terminal of the initializing signal generator 4 becomes "H", the gate circuit 7 validates the output signal of the valid key discrimination device 5.

⑤ When the key #5 is depressed within the set value T0 (2.5 seconds) of the set time conserving ROM 9, the output terminal #5 of the gate circuit 7 becomes "L," and the STOP terminal of the timer 10 becomes "L," so that the delivery of the timer value is stopped. Since T0>T1 holds, the output terminal OUT of the comparator 13 holds the "H" state.

⑥ Since the input terminals of the gate 14 change from "L," "H" and "H" to "L," "H" and "L," the "H"="L" signal is delivered to the EN terminal of the diagnosing device 16 so as to actuate this device 16.

⑦ Meanwhile, the intput terminals of the gate 15 remain unchanged at "L" and "H," and the "H" signal continues to be delivered to the EN terminal of the stitch forming device 17, so that the device 17 is not actuated.

⑧ In the item ⑤, unless the predetermined key #5 is depressed within the set value T0 (2.5 seconds), the timer value of the timer 10 continues the addition. Then, when the timer value has become T1, the comparator 13 changes the status of the output terminal OUT into "L" on the basis of T0≦T1 and holds it.

⑨ The input terminals of the gate 14 change from "L," "H" and "H" to "L," "L" and "H," but the output terminal thereof remains unchanged at "H," so that the diagnosing device 16 is not actuated.

⑩ Besides, since the input terminals of the gate 15 change from "L" and "H" to "L" and "L," the output terminal thereof changes from "H" to "L," and the stitch forming device 17 is actuated.

⑪ In the item ①, in case when the turning "on" operation of the power switch with the key #1 kept depressed is not performed, the input terminals of the AND circuit 6 are "L" and "H," and hence, the output terminal thereof becomes "H."

⑫ Since the START terminal of the timer 10 is "H," this timer is not actuated, and the T1 input of the comparator 13 remains unchanged at the initial zero value.

⑬ Besides, when the output of the initializing signal generator 4 has changed from "L" to "H," the latch 8 latches the "H" input of the D terminal as the output of the Q terminal.

⑭ Owing to the input of T0>T1(=0), the OUT terminal of the comparator 13 holds the "H" output.

⑮ The input terminals of the gate 14 are "H," "H" and "H," and the output terminal thereof becomes "H." Even if the key #5 is depressed, the output terminal of the gate 14 remains unchanged at "H" though the input terminals thereof change to "H," "H" and "L."

The diagnosing device 16 is not actuated because the EN terminal thereof remains unchanged at "H."

⑯ Meanwhile, the input terminals of the gate 15 are "H" and "H," and the output terminal thereof becomes "L" to actuate the stitch forming device 17.

⑰ As described above, only in the case where the power switch is turned "on" with the key #1 kept depressed and where the key #5 is depressed within the set time, the diagnosing device 16 can be actuated.

⑱ Moreover, the gate circuit 7 performs the control that, even if any selection key has been depressed at the turn-on of the power switch, no signal enters the stitch forming device 17.

As described above, according to the present invention, keys which are ordinarily used are employed for the selection of diagnosing device 16, so that increase in cost and a structural alteration are not involved. In addition, the operations of the two specified keys limited in time are set, whereby the actuation of the diagnosing device ascribable to the erroneous operation of a user can be prevented.

What is claimed is:

1. An electronic sewing machine comprising a power switch; a pattern selecting device including a plurality of pattern selecting switches; a function selecting device including a plurality of switches for selecting a function of a stitch forming device; a diagnosing device for checking operational conditions of electronic parts of the sewing machine; means for discriminating the actuation states of a predetermined pattern selecting switch and a predetermined function selecting switch to produce a first signal when one of said predetermined switches is switched on; an initiation signal generator for producing a second signal when said power switch is switched on while said predetermined pattern selecting switch is switched on; first gating means for producing a third signal in response to the simultaneous generation of said first and second signals; time lapse counting means started in response to said third signal to produce a fourth signal representing the counted time lapse, and being stopped in response to the switching on of said predetermined function selecting switch; means for storing a coded signal representing a predetermined reference period of time; means for comparing said coded signal with said fourth signal to produce a fifth signal when the lapsed time represented by said fourth signal is smaller than said reference time period; second gating means responsive to the simultaneous generation of said first and fifth signals and to the switching-on of said predetermined function selecting switch to produce a sixth signal for enabling said diagnosing device; and third gating means responsive to the simultaneous generation of said first and fifth signals to produce a seventh signal for disabling said stitch forming device.

2. A sewing machine as defined in claim 1 wherein said comparing means produces an eighth signal when the lapsed time represented by said fourth signal equals said reference time period; said second gating means being responsive to the simultaneous generation of said first and eighth signals and to the switching-on of said predetermined function selecting switch to produce a ninth signal for disabling said diagnosing device; and said third gating means being responsive to the simultaneous generation of said first and eighth signals to produce a tenth signal for enabling said stitch forming device.

* * * * *